United States Patent
Marks (10) Patent No.: US 9,304,762 B2
(45) Date of Patent: Apr. 5, 2016

(54) AUTOMATICALLY CUSTOMIZING A COMPUTER-EXECUTABLE APPLICATION AT RUNTIME

(71) Applicant: Apple Inc., Cupertino, CA (US)

(72) Inventor: Paul Marks, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/192,035

(22) Filed: Feb. 27, 2014

(65) Prior Publication Data

US 2014/0250428 A1 Sep. 4, 2014

Related U.S. Application Data (60) Provisional application No. 61/771,737, filed on Mar. 1, 2013.

(51) Int. Cl.
*G06F 9/44* (2006.01)
*G06F 11/36* (2006.01)
*G06F 9/445* (2006.01)

(52) U.S. Cl.
CPC ............... *G06F 8/70* (2013.01); *G06F 9/44521* (2013.01); *G06F 11/3672* (2013.01)

(58) Field of Classification Search
CPC ............ G06F 9/44521; G06F 11/3688; G06F 11/3692; G06F 8/70; G06F 11/3672
USPC .................................. 717/124–133, 162–167
See application file for complete search history.

(56) References Cited

U.S. PATENT DOCUMENTS

| | | | |
|---|---|---|---|
| 6,216,261 B1 | 4/2001 | Mitchell | |
| 7,194,744 B2* | 3/2007 | Srivastava et al. | 719/331 |
| 7,661,088 B2 | 2/2010 | Burke | |
| 8,079,019 B2* | 12/2011 | Lindo et al. | 717/129 |
| 8,677,332 B1* | 3/2014 | Hjelmstad et al. | 717/140 |
| 2009/0024986 A1 | 1/2009 | Meijer et al. | |
| 2009/0089779 A1 | 4/2009 | Brengle et al. | |
| 2011/0167404 A1 | 7/2011 | Liu et al. | |
| 2014/0053282 A1* | 2/2014 | Court | 726/30 |

OTHER PUBLICATIONS

Daniel Vaughan, "Clog: Client Logging, Silverlight Edition", 2009, Code Project, retrieved from http://www.codeproject.com/Articles/21407/Clog-Client-Logging-Silverlight-Edition , 15 pages.*

CodePlex Project Hosting for Open Source Software, "patterns & practices: Prism—How to handle exceptions in a module? ", 2012, retrieved from, https://compositewpf.codeplex.com/discussions/36371, 3 pages.*

* cited by examiner

*Primary Examiner* — Ted T Vo

(74) *Attorney, Agent, or Firm* — Blakely, Sokoloff, Taylor & Zafman LLP (57) ABSTRACT

Disclosed is a method of automatically customizing a computer executable application, such as a test automation harness, based on currently installed modules. The functionality of the application can be split in multiple modules. At runtime, the application can automatically detect the presence or absence of a module. If a module is available, it can automatically be integrated with the application such that the functionality, such as language-level features and constructs, provided by the module is active and/or exposed. If the module is absent, the application can continue executing without the functionality provided by the module.

21 Claims, 5 Drawing Sheets

| Action | Set of Available Application Functionalities |
|---|---|
| | Core |
| 1. loadMod(pathToModule1) | Core, Module1 |
| 2. loadMod(pathToModule2) | Core, Module1 |
| 3. loadMod(pathToModule3) | Core, Module1, Module3 |

FIG. 4

FIG. 5

US 9,304,762 B2

AUTOMATICALLY CUSTOMIZING A COMPUTER-EXECUTABLE APPLICATION AT RUNTIME

CROSS REFERENCE TO RELATED APPLICATIONS

This application claims the benefit of U.S. Provisional Patent Application No. 61/771,737, entitled "AUTOMATICALLY CUSTOMIZING A COMPUTER-EXECUTABLE APPLICATION AT RUNTIME," filed on Mar. 1, 2013, which is incorporated herein by reference in its entirety.

TECHNICAL FIELD

The present technology pertains to customizing a computer-executable application, and more specifically pertains to customizing a computer-executable application at runtime through modularization.

BACKGROUND

As software becomes more complex and specialized so do the testing harnesses used to verifying the software's functionality. Often a testing harness includes some basic functionality that is useful for testing a wide variety of applications. However, a testing harness can also include specialized functionality, such as functionality specific to a particular application, a class of applications, or even a particular developer. In these cases, the functionality of the testing harness has to be extended or augmented. The customization can be done through modularization and libraries, such as static or dynamic link libraries.

A major drawback to the static and dynamic link library approach is that the functionality provided in a library must be known at compile or link time. That is, the particular functionality that is to be included in the customized build of the testing harness has to be specified prior to producing the computer executable application. This places a heavy burden on the developer of the testing harness when the developer is committed to releasing customized versions of the testing harness. For example, if a testing harness developer has created a testing harness for testing internal software, the harness may include functionality that is specific to the developer and/or includes proprietary information, but the testing harness may also include functionality that of interest to third-party developers. If the testing harness developer wants to release the testing harness to third-party developers, the testing harness developer must sanitize the testing harness by creating a separate third-party build that does not include the proprietary functionality. This approach not only creates extra overhead, but it also leaves open the possibility of accidentally including the proprietary information.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for customizing a computer executable application at runtime. The runtime customization addresses limitations found in many applications that rely on static or dynamic linked libraries or traditional runtime plugins. With static or dynamic libraries, the functionality provided in a library must be known at compile or link time. That is, the particular functionality that is to be included in the customized build of the testing harness has to be specified prior to producing the computer executable application. Furthermore, there can be overhead associated with releasing customized versions of an application because the various libraries to be included must be specified at compile or link time. Runtime plugins are an alternative to static or dynamic libraries. However, runtime plugins are generally limited to providing additional functions, and not additional language-level features or constructs.

To address these limitations, the disclosed technology can update the set of available functionalities, which can include language-level features and/or constructs, at runtime without needing to know which libraries or modules will be available when the application is produced. To accomplish the runtime customization, an application can be designed to include a core application and one or more modules. The core application can include a core set of functionalities. Each module can also include a set of functionalities. At runtime, a request to load a module can be triggered, such as by a module initialization phase or a request for a feature in a module. In response to the request the core application can attempt to load the module. For example, the core application can look for the module at a specific file path where the module would be installed. If the module is present, i.e. installed, the load will be successful and the core application can add the module's functionalities to the set of available application functionalities. For example, the module can be parsed to identify its set of functionalities. If the module is absent an exception or other mechanism can be triggered. The exception can be caught by the core application and execution can continue without adding new functionalities to the set of available functionalities.

At some point during the execution of the application, the set of available functionalities can be exposed. For example, if the set of available functionalities includes command line options, a list of available command line options can be display to a user of the application. The list can include command line options from the core application and/or any loaded module whose set of functionalities includes command line options. In another example, if the set of available functionalities includes logging functionalities, the logging functionalities can be activated and execution data for a test application can be recorded. The recorded execution data can include data items based on logging functionalities provided by the core application and/or any loaded module whose set of functionalities includes logging functionalities. In still another example, if the set of available functionalities includes event notifications, the event notifications can be registered. The registered event notifications can include event notifications from the core application and/or any loaded module whose set of functionalities includes event notifications. In a further example, if the set of available functionalities can include exporting a locally scoped symbol to a globally scoped symbol, the symbol can be globally exposed using the symbol name specified in the module.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for the ability customize the language-level features and constructs available in an application at runtime. The disclosure first sets forth a discussion of a basic general purpose system or computing device in FIG. 1A and FIG. 1B that can be employed to practice the concepts disclosed herein before returning to a more detailed description of customizing a computer-executable application at runtime.

Figure 1A:
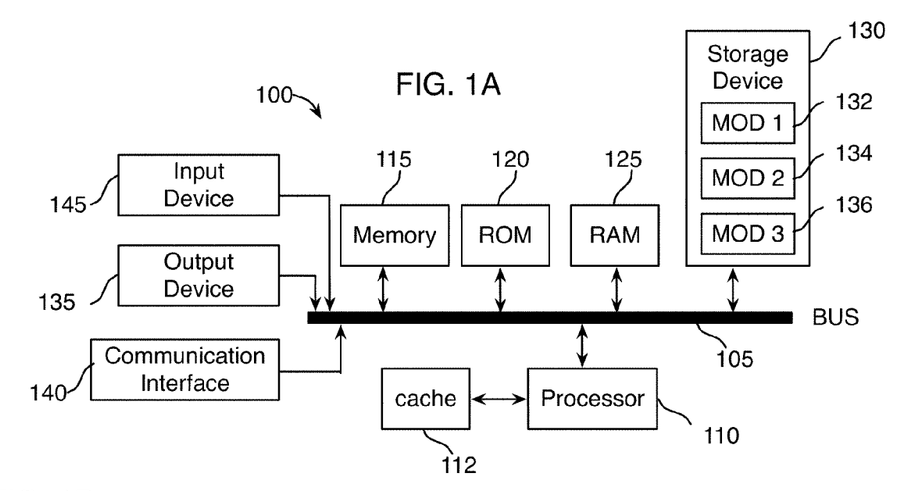
FIG. 1A and FIG. 1B illustrate exemplary system embodiments.
Figure 1B:
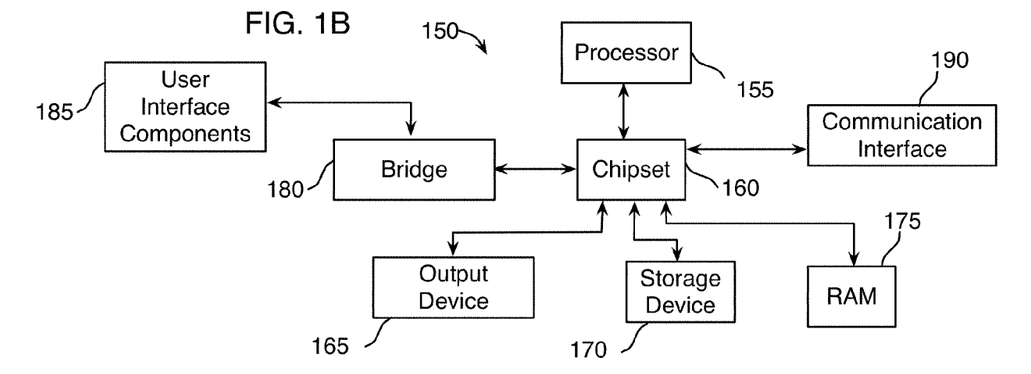

FIG. 1A and FIG. 1B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 1A illustrates a conventional system bus computing system architecture 100 wherein the components of the system are in electrical communication with each other using a bus 105. Exemplary system 100 includes a processing unit (CPU or processor) 110 and a system bus 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules can control or be configured to control the processor 110 to perform various actions. Other system memory 115 may be available for use as well. The memory 115 can include multiple different types of memory with different performance characteristics. The processor 110 can include any general purpose processor and a hardware module or software module, such as module 1 132, module 2 134, and module 3 136 stored in storage device 130, configured to control the processor 110 as well as a special-purpose processor where software instructions are incorporated into the actual processor design. The processor 110 may essentially be a completely self-contained computing system, containing multiple cores or processors, a bus, memory controller, cache, etc. A multi-core processor may be symmetric or asymmetric.

To enable user interaction with the computing device 100, an input device 145 can represent any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include software modules 132, 134, 136 for controlling the processor 110. Other hardware or software modules are contemplated. The storage device 130 can be connected to the system bus 105. In one aspect, a hardware module that performs a particular function can include the software component stored in a computer-readable medium in connection with the necessary hardware components, such as the processor 110, bus 105, display 135, and so forth, to carry out the function.

FIG. 1B illustrates a computer system 150 having a chipset architecture that can be used in executing the described method and generating and displaying a graphical user interface (GUI). Computer system 150 is an example of computer hardware, software, and firmware that can be used to implement the disclosed technology. System 150 can include a processor 155, representative of any number of physically and/or logically distinct resources capable of executing software, firmware, and hardware configured to perform identified computations. Processor 155 can communicate with a chipset 160 that can control input to and output from processor 155. In this example, chipset 160 outputs information to output 165, such as a display, and can read and write information to storage device 170, which can include magnetic media, and solid state media, for example. Chipset 160 can also read data from and write data to RAM 175. A bridge 180 for interfacing with a variety of user interface components 185 can be provided for interfacing with chipset 160. Such user interface components 185 can include a keyboard, a microphone, touch detection and processing circuitry, a pointing device, such as a mouse, and so on. In general, inputs to system 150 can come from any of a variety of sources, machine generated and/or human generated.

Chipset 160 can also interface with one or more communication interfaces 190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 155 analyzing data stored in storage 170 or 175. Further, the machine can receive inputs from a user via user interface components 185 and execute appropriate functions, such as browsing functions by interpreting these inputs using processor 155.

It can be appreciated that exemplary systems 100 and 150 can have more than one processor 110 or be part of a group or cluster of computing devices networked together to provide greater processing capability.

Having disclosed some components of a computing system, the disclosure now turns to a discussion of automatically customizing a computer executable application at runtime. A person skilled in the relevant art will recognize that while the disclosure frequently uses a testing harness application to illustrate the disclosed technology, runtime customization can be applied to any type of computer executable application.

Figure 2:
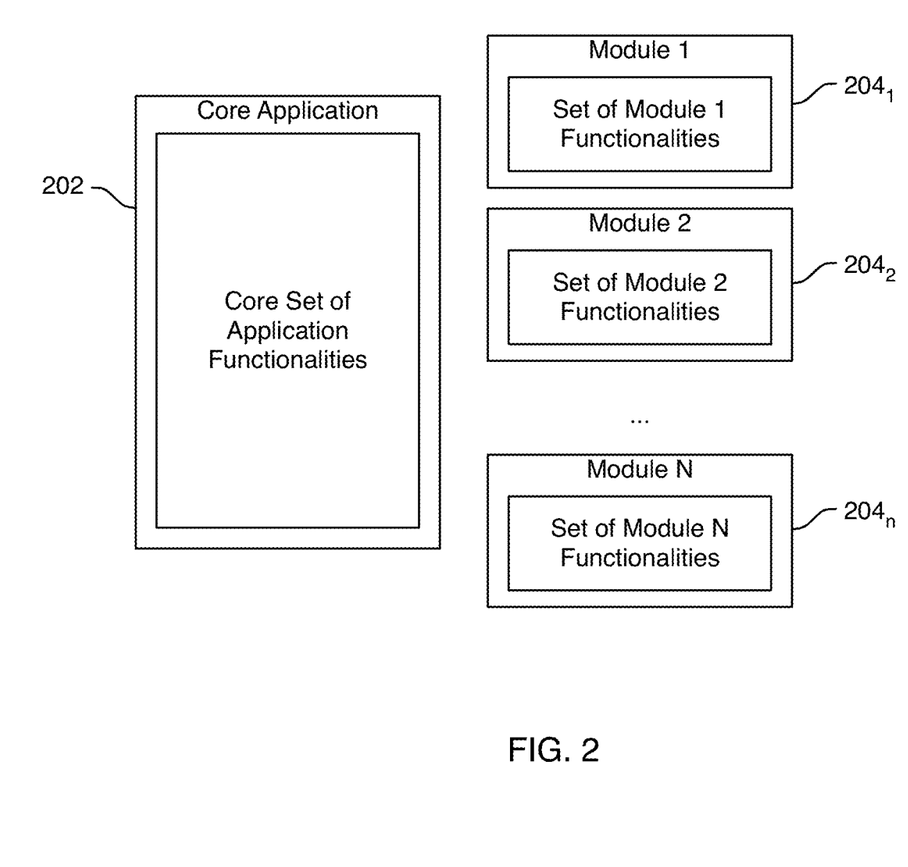
FIG. 2 illustrates an exemplary computer executable application split into modules.

To enable automatic customization at runtime, a computer executable application can be split into multiple modules. For example, FIG. 2 illustrates an exemplary application split into core application 202 and modules $204_1, 204_2, \ldots, 204_n$. Core application 202 can include a core set of application functionality including language-level features and constructs. The core set of functionalities can be a minimum set of functionality required for the application to run or be useful if no other modules are installed. Each of modules $204_1, 204_2, \ldots, 204_n$ can be designed to include a particular set of functionalities that are specific to the module. For example, a module could include logging functionality while another module could include functionality for interacting with and manipulating data provided by a particular database. In another example, a module can export symbol names thus forcing the symbols in to the global namespace, such as:

```
__app_export__ = {
    'do_something': 'mymodule_do_something'
}
```

In this case, the module exports mymodule_do_something so that it is globally visible as do_something. In yet another example, a module can define event notification handlers that automatically extend the set of handlers invoked when the named notification is sent, such as:

```
__app_events__ = {
    'app.runtime.load': 'plugin_did_load',
    'app.runtime.quit': 'plugin_will_quit',
    ...
}
def plugin_did_load(event, info, object=None):
    assert event == 'app.runtime.load'
def plugin_will_quit(event, info, object=None):
    assert event == 'app.runtime.quit'
```

By splitting the application into multiple modules, only the modules necessary to perform a desired task or provide a feature and/or construct need to be installed. To illustrate an exemplary usage scenario consider the following: an application developer has developed a testing platform. The testing platform includes a number of features that would be useful to third parties, and thus the application developer wishes to make the testing platform available for use by the third parties. However, the application developer has a proprietary database that is used as part of the testing platform. Because the database is proprietary, the application developer may not want to include the functionality, such as one or more event notifications, associated with the database. By using the disclosed technology, the application developer can design the testing platform such that the functionality for interacting with and manipulating data provided by the proprietary database can be isolated in a module. When the application developer distributes the testing platform to the third parties, the application developer can exclude the database functionality module.

The above exemplary usage scenario focused on an application developer wishing to withhold proprietary functionality. However, a user of the modularized application can also leverage the modularized nature of the application. To illustrate a second exemplary usage scenario consider the following: a developer has obtained a testing platform. The testing platform includes a variety of functionality, a portion of which is not needed by the developer. As long as the modules are documented, the developer can elect to only install the modules necessary to perform the developer's desired tasks. Other usage scenarios in which only a subset of the modules are needed are also possible.

Figure 3:
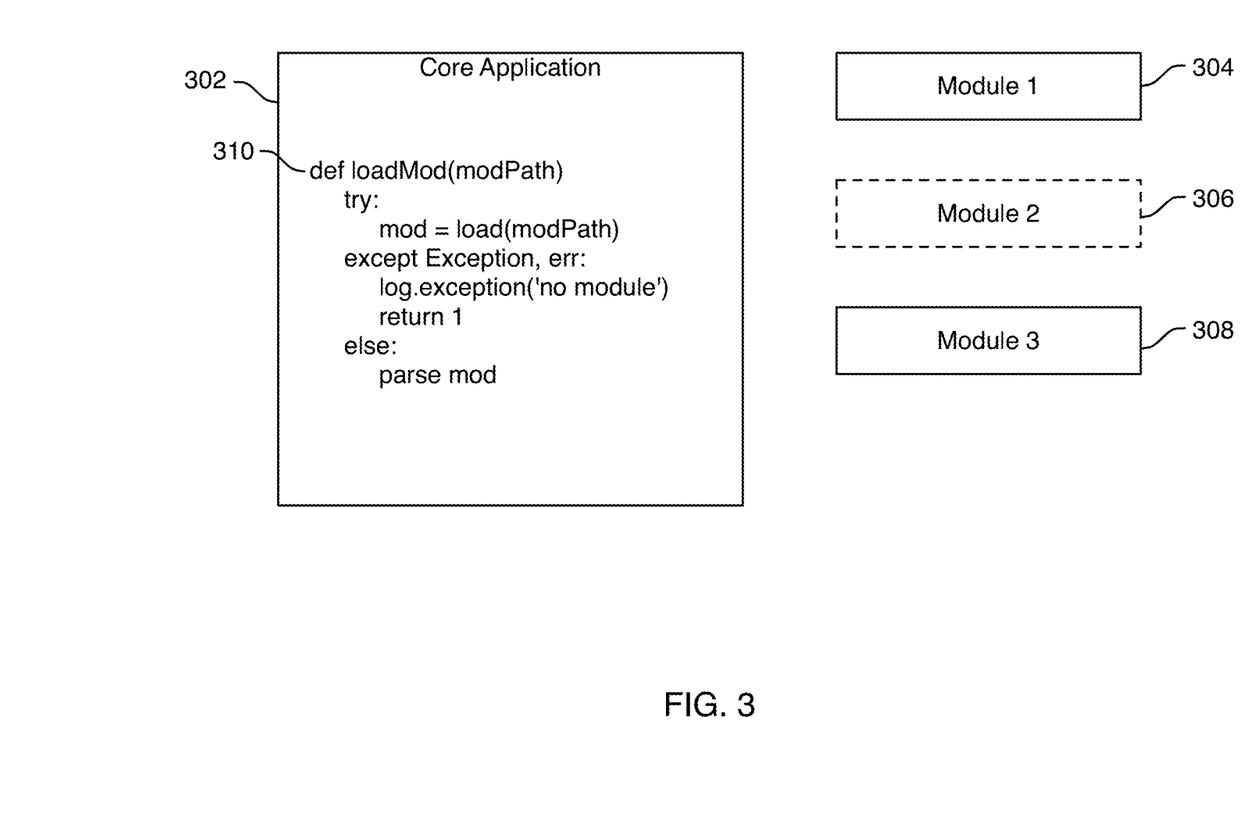
FIG. 3 illustrates an exemplary runtime customizable computer executable application.

Once the core application and one or more modules are installed, the application can be customized at runtime by extending the set of available features and/or constructs. That is, the one or more modules do not have to be linked with the core application at compile or linking time, but can instead be detected at runtime. When a module is detected, the functionality provided by the module can be registered and exposed as part of the executing application. FIG. 3 illustrates an exemplary runtime customizable application. The exemplary runtime customizable application is composed of core application 302 and three modules 304, 306, and 308. To customize the available functionality at runtime, core application 302 can include a module loading function, such as loadMod 310. During execution of the application, function loadMod 310 can attempt to load a particular module. If the module is absent, function loadMod 310 can catch an exception and possibly log it. By catching the exception, the application can continue executing using the functionality already recognized. If the module is presented, e.g. has been installed, function loadMod 310 can parse the module to identify the functionality provided by the module, and add the module's functionality to the set of available functionalities. For example, core application 302 can call function loadMod 310 three times, once for each of modules 304, 306, and 308. Modules 304 and 308 are currently installed, so when function loadMod 310 is called the functionality in modules 304 and 308 can be added to the set of currently available functionalities. However, module 306 is not installed. Therefore, when function loadMod 310 is called for module 306, function loadMod 310 will catch the exception and the application will continue executing without adding new functionality to set the available functionalities.

Calling function loadMod 310 can be triggered in a number of ways. For example, the core application can include an initialization phase that attempts to register all possible modules. In another example, the core application can register the modules at various points during execution, such as when a particular feature is requested. In response to the feature request, core application can attempt to register the module that includes the feature.

In some cases, functionality can be loaded from a module and can later become unavailable. The customized application can be configured to handle unavailable functionality in a similar manner as unavailable modules. That is, the application can be configured to try to use the functionality. If the functionality is absent, an exception can be thrown and caught, thus allowing the application to continue executing.

For example, the following pseudo-code example illustrates how the application can be configured to handle unavailable functionality:

```
try:
    # try to use functionality from the set of available functionalities
    call_added_function( );
except NameError:
    # expected functionality in not available
    pass
```

Figure 4:
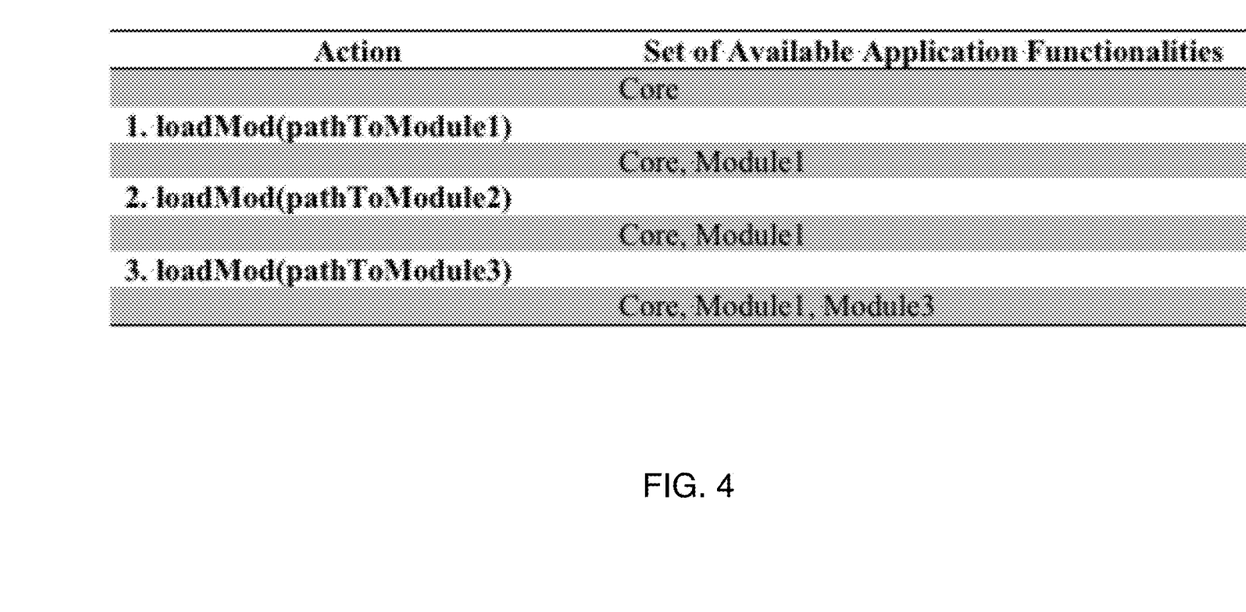
FIG. 4 illustrates an exemplary sequence of module load actions and corresponding set of available application functionalities.

FIG. 4 illustrates an exemplary sequence of module load actions and corresponding set of available application functionalities. The exemplary sequence is illustrated using core application 302 and modules 304, 306, and 308 from FIG. 3. Prior to loading any modules, the set of available application functionalities includes just the core set of functionalities. After calling function loadMod 310 with module 304, the set of available application functionality now also includes the functionalities from module 304. After calling function load-Mod 310 with module 306, the set of available application functionalities does not change because module 306 is not installed. After calling function loadMod 310 with module 308, the set of available application functionalities is expanded to also include the functionalities from module 308. In summary after attempting to load all three of modules 304, 306, and 308, the set of available application functionalities includes the core functionalities, and the functionalities from modules 304 and 308.

Figure 5:
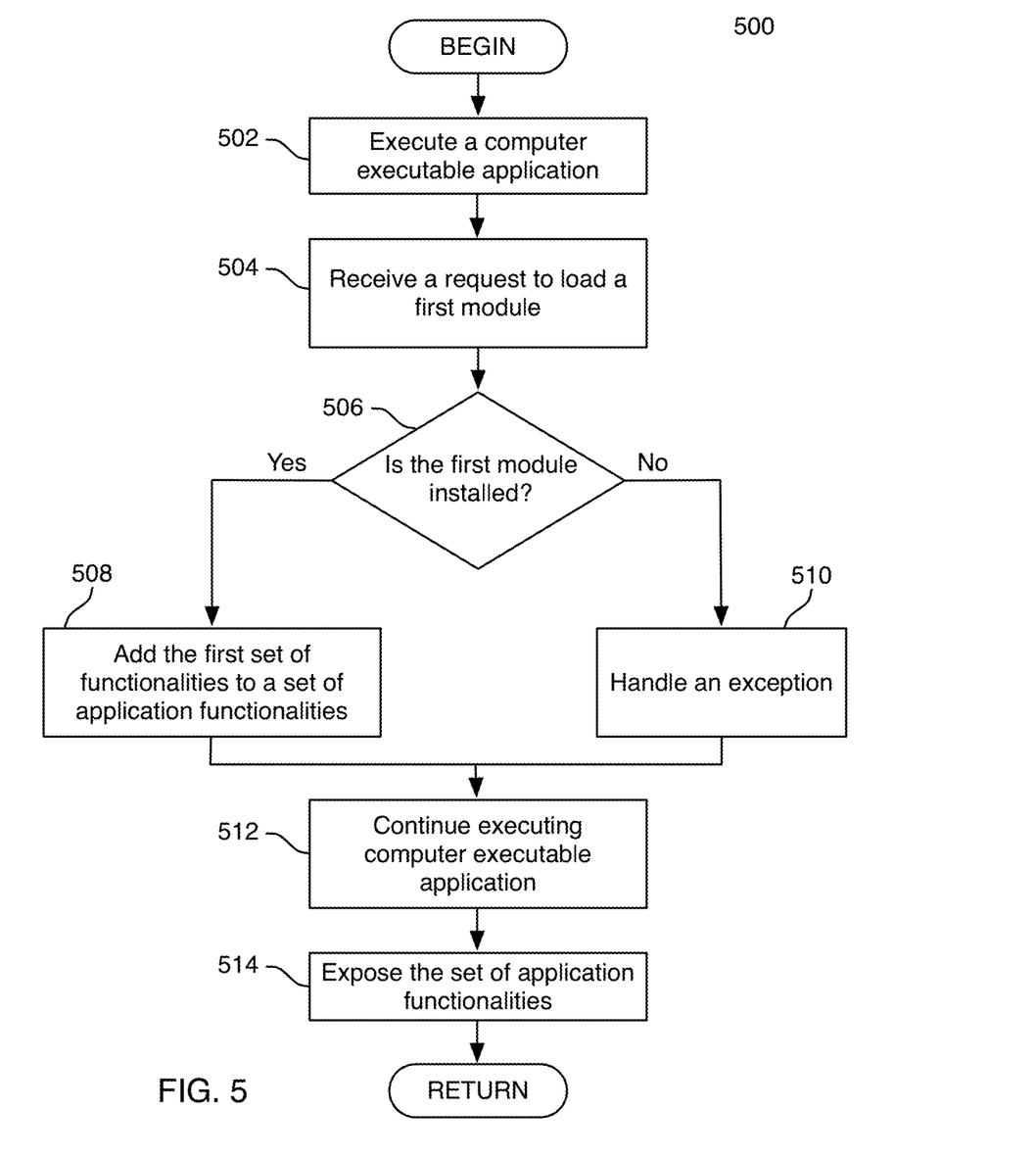
FIG. 5 illustrates an exemplary method embodiment for customizing an application at runtime.

FIG. 5 is a flowchart illustrating an exemplary method 500 for automatically customizing an application at runtime, such as a testing harness or testing platform application. For the sake of clarity, this method is discussed in terms of an exemplary computing system such as is show in FIG. 1. Although specific steps are show in FIG. 5, in other embodiments a method can have more or less steps than shown.

The automatic customization process begins when the computing system executes the customizable application (502). The customizable application can be any type of computer executable application that is designed to include a core application with a set of core functionalities and at least one module with a set of additional functionalities. The additional functionalities can include language-level features and/or constructs.

At some point during the execution of the application, a request to load a first module can be triggered (504). The request can be triggered in a variety of ways. For example, the core application can include an initialization phase that attempts to register all possible modules. In another example, the core application can register the modules at various points during execution, such as when a particular feature is requested. In response to the feature request, core application can attempt to register the module that includes the feature.

In response to the request, the system can check if the first module is installed (506). If the first module is installed, a first set of functionalities from the first module can be added to the set of available functionalities for the application (508). In some cases, the first set of functionalities can be identified by parsing the first module. The first set of functionalities can include a variety of application functionality, such as command line options, logging features, event notifications, symbol exporting, and/or any other functionality applicable to the application. If the first module is absent, e.g. not installed on the system, an exception can be thrown, which can be caught by the application (510).

After updating the set of available functionalities or handling the exception, the system can continue executing the application (512). In some cases, the continued execution can include exposing the set of available application functionalities (514). For example, if the first set of functionalities includes command line options, exposing the set of available application functionalities can include displaying a list of the command line options currently available. The list can include the command line options from the first set of functionalities, as well as command line options from the core application and/or other modules. In some cases, the displaying the list of command line options can occur in response to a request to display command line options. For example, during execution of the application, a user can enter a command to display the currently available command line options.

In another example of exposing the set of available application functionalities, if the first set of functionalities includes logging functionality, exposing can include activating a logging feature and capturing execution data for a test application. In this case, at least one execution data item from the execution data can be based on a logging functionality in the first set of functionalities. The recorded execution data can also include data items based on a logging functionality in the core application and/or other modules.

In still another example of exposing the set of available application functionalities, if the first set of functionalities includes event notifications, exposing can include registering to receive at least one event notification defined in the set of available application functionalities. In some cases, registering to receive at least one event notification can also include registering to receive event notifications from the core application and/or other modules.

In a further example of exposing the set of available application functionalities, if the set of available functionalities includes exporting a locally scoped symbol to a globally scoped symbol, exposing can include forcing the symbol in to the global namespace.

After completing step 514, the computing system can resume previous processing, which can include repeating method 500.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method of automatically customizing a computer executable application, the method comprising:
    executing, via a processor, the computer executable application, wherein the computer executable application includes a set of application functionalities;
    during execution, receiving a request to load a first set of software instructions, the first set of software instructions including a first set of functionalities comprising at least one of a language-level feature or a language-level construct, with the request being triggered by the computer executable application;
    in response to the request to load, determining whether the first set of software instructions is installed based on whether the first set of software instructions is present at a specific file path;
    continuing the execution with the set of application functionalities if the first set of software instructions is not installed;
    loading the first set of software instructions if the first set of software instructions is installed; and
    parsing the loaded first set of software instructions to identify the first set of functionalities in response to determining that the first set of software instructions is loaded, wherein the first set of functionalities identified are added to the set of application functionalities.

2. The computer-implemented method of claim 1, wherein the first set of functionalities includes at least one of command line parameters, event notifications, logging functionality, or symbol exports.

3. The computer-implemented method of claim 1 further comprising:
    in response to determining that a functionality in the set of application functionalities is absent, handling an exception and continuing execution of the computer executable application.

4. The computer-implemented method of claim 1 further comprising:
    exposing the set of application functionalities including the first set of functionalities.

5. The computer-implemented method of claim 4, wherein the first set of functionalities includes command line options, and wherein exposing the set of application functionalities further comprises:
    displaying a list of command line options available in the computer executable application, the list of command line options including command line parameters in the first set of functionalities.

6. The computer-implemented method of claim 5, wherein the displaying occurs in response to receiving a request to display the list of command line options available in the computer executable application.

7. The computer-implemented method of claim 1, wherein the trigger is at least one of an initialization phase or a request for a feature in the first module.

8. A manufacture comprising:
    a processor;
    a computer-executable program stored on a non-transitory computer-readable storage medium which, when executed by a computing device, causes the computing device to perform a method comprising:
        executing a computer executable application including a set of application functionalities;
        during execution, receiving a request to load a first set of software instructions, the first set of software instructions including a first set of functionalities comprising at least one of a language-level feature or a language-level construct, with the request being triggered by the computer executable application;
        in response to the request to load, determining whether the first set of software instructions is installed based on whether the first set of software instructions is present at a specific file path;
        continuing the execution with the set of application functionalities if the first set of software instructions is not installed;
        loading the first set of software instructions if the first set of software instructions is installed; and
        parsing the loaded first set of software instructions to identify the first set of functionalities in response to determining that the first set of software instructions is installed, wherein the first set of functionalities identified are added to the set of application functionalities.

9. The manufacture of claim 8, the method further comprising:
    in response to determining that a functionality in the set of application functionalities is absent, handling an exception and continuing execution of the computer executable application.

10. The manufacture of claim 8 further comprising:
    exposing the set of application functionalities including the first set of functionalities.

11. The manufacture of claim 10, wherein the first set of functionalities includes logging functionality, and wherein exposing the set of application functionalities further comprises:
    executing a logging feature to record execution data for a test application, wherein at least one execution data item from the recorded execution data is based on a logging functionality in the first set of functionalities.

12. The manufacture of claim 8, wherein the receiving the request to load the first set of software instructions is triggered by a request for a feature in the first set of software instructions.

13. The manufacture of claim 8 further comprising:
during execution, receiving a request to load a second set of software instructions, the second set of software instructions including a second set of functionalities comprising at least one of a language-level feature or a language-level construct; and
in response to determining that the second set of software instructions is installed, adding the second set of functionalities to the set of application functionalities.

14. The manufacture of claim 13, wherein the receiving the request to load the second set of software instructions is triggered by a request for a feature in the second set of software instructions.

15. The manufacture of claim 8, wherein the trigger is at least one of an initialization phase or a request for a feature in the first set of software instructions.

16. A system for automatically customizing a computer executable application, the system comprising:
a processor;
a first set of software instructions configured to control the processor to execute the computer executable application, wherein the computer executable application includes a set of application functionalities;
a second set of software instructions configured to control the processor to receive a request to load a first component including a first set of functionalities;
a third set of software instructions configured to control the processor to determine, in response to the request to load, whether the first set of software instructions is installed based on whether the first set of software instructions is present at a specific file path, wherein the computer executable application continues to execute with the set of application functionalities if the first set of software instructions is not installed;
a fourth set of software instructions configured to control the processor to load a first set of software instructions during execution of the computer executable application if the first set of software instructions is installed, wherein loading the first set of software instructions is triggered by the computer executable application;
a fifth set of software instructions configured to control the processor to parse the loaded first set of software instructions to identify the first set of functionalities comprising at least one of a language-level feature or a language-level construct; and
a sixth set of software instructions configure to control the processor to add the identified first set of functionalities to the set of application functionalities, wherein adding the functionalities occurs in response to determining that the first set of software instructions is installed.

17. The system of claim 16 further comprising:
a seventh set of software instructions configured to control the processor to expose the set of application functionalities including the first set of functionalities.

18. The system of claim 17, wherein the first set of functionalities includes event notifications, and wherein exposing the set of application functionalities further comprises:
registering to receive at least one event notification defined in the set of application functionalities.

19. The system of claim 17, wherein the first set of functionalities includes symbol exports, and wherein exposing the set of application functionalities further comprises:
forcing the symbol in to the global namespace.

20. The system of claim 16, wherein loading the first component is triggered by at least one of an initialization phase or a request for a feature in the first component.

21. The system of claim 16 further comprising:
in response to determining that a functionality in the set of application functionalities is absent, handling an exception and continuing execution of the computer executable application.

* * * * *